United States Patent [19]

McMaster et al.

[11] Patent Number: 4,470,838
[45] Date of Patent: Sep. 11, 1984

[54] COMPOSITE BLASTHEAD FOR QUENCH STATION OF GLASS SHEET TEMPERING SYSTEM

[75] Inventors: Ronald A. McMaster, Woodville; Robert G. McMaster, Elmore, both of Ohio

[73] Assignee: Glasstech, Inc., Perrysburg, Ohio

[21] Appl. No.: 470,153

[22] Filed: Feb. 28, 1983

[51] Int. Cl.[3] .............................. C03B 27/00
[52] U.S. Cl. ...................................... 65/348; 65/351
[58] Field of Search ................. 65/114, 348, 351

[56] References Cited

U.S. PATENT DOCUMENTS 3,936,291 2/1976 McMaster ............................ 65/351
4,300,937 11/1981 Rhonehouse ..................... 65/351 X Primary Examiner—Arthur Kellogg

[57] ABSTRACT

A composite blasthead (18,20,70,72,118,120) for a quench station (16) of a glass sheet tempering system (10) is disclosed as including outer layers (28,71,73,128,128') and an inner layer comprising inserts (30,32,34,74,76,130,130') therebetween for defining passages (36,80,82,136) through which cooling gas is supplied to a glass sheet in order to provide tempering. All of the inserts have inner end portions (38,40,42,81,138,138') that cooperate to define inlets (44,86,144,144') to the passages and also have outer end portions (46,48,50,88,146,146') that cooperate to define passage outlets (52,90,152,152') through which the quenching gas exits. All of the passages have a circular cross section along substantially the entire length of the passages. All of the inserts are of a configuration such that the passages of each blasthead are aligned with the passages of the other blasthead, so that the gas impinges on the glass surfaces in an opposed relationship with a uniform pattern over said surfaces thereby optimizing the degree of glass tempering.

7 Claims, 15 Drawing Figures

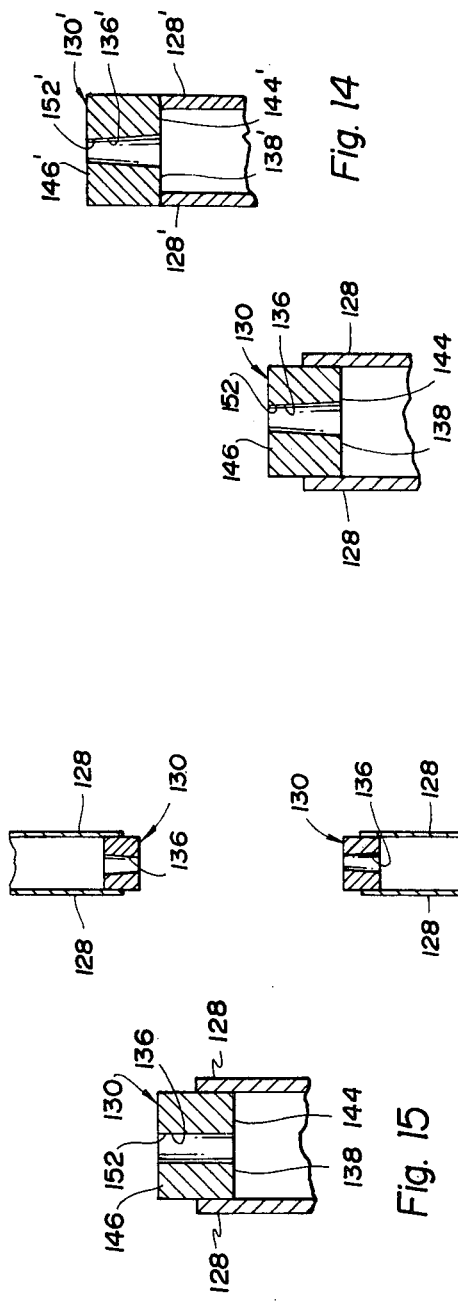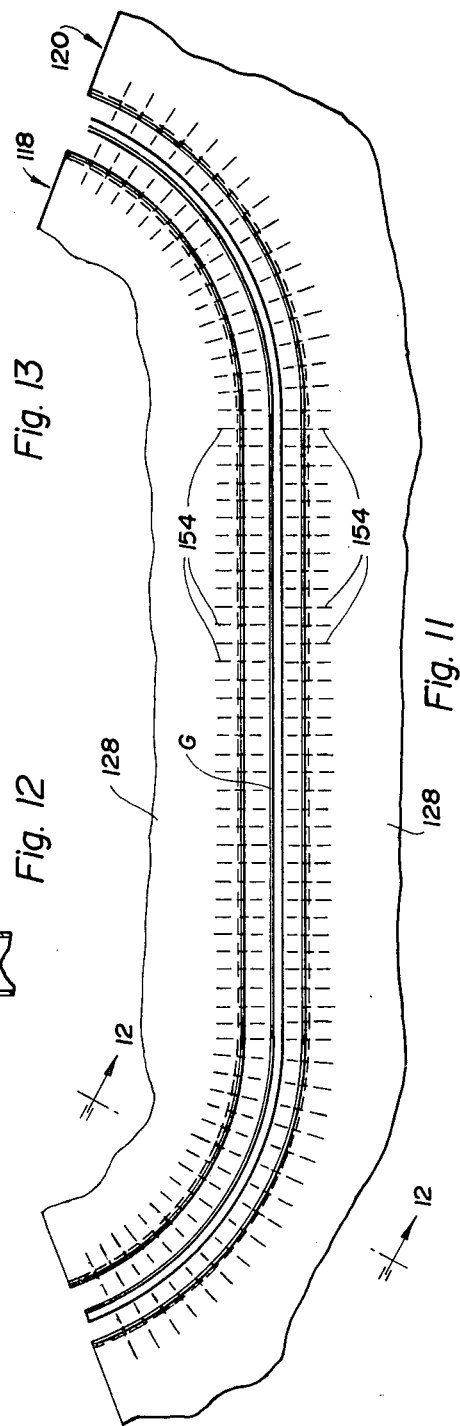

COMPOSITE BLASTHEAD FOR QUENCH STATION OF GLASS SHEET TEMPERING SYSTEM

TECHNICAL FIELD

This invention relates to a composite blasthead for a quench station of a glass sheet tempering system.

BACKGROUND ART

Glass sheets are tempered to provide increased mechanical strength and the characteristics of breaking into small pieces without forming sharp slivers as is the case with annealed glass. Conventionally, tempering of glass is performed by heating and subsequent sudden chilling performed at a quench station between opposed blastheads. Quenching gas, which is conventionally air, is supplied to the opposed blastheads to perform the sudden chilling that tempers the glass. Best results are obtained when the quenching gas is supplied in a perpendicular relationship to the glass sheet since a more uniform distribution of the gas and the consequent cooling is achieved.

U.S. Pat. No. 4,300,937 discloses a glass tempering blasthead which includes, in a first embodiment, jet assemblies which are made by welding complementary stampings together and filling in the open ends with matching plates. In a second embodiment, each jet assembly is fabricated by welding a series of spacer elements between opposite side members to thereby produce a series of tubes.

U.S. Pat. No. 3,936,291 discloses a glass tempering blasthead that is fabricated from stamped metal components of a generally U-shaped cross section. Each of the stamped metal components includes legs that are formed to define nozzle passages when placed adjacent another like component. With such a blasthead, a single stamping die set can be utilized to stamp the required components. This blasthead has particular utility when utilized to temper flat glass as each of the nozzle passages discharges the cooling gas in an orientation perpendicular to the plane of the heated glass sheet to be tempered.

U.S. Pat. No. 3,393,062 discloses glass sheet tempering apparatus which, in one embodiment, includes individual tubes that are disposed along curved manifolds extending therefrom so as to be oriented generally perpendicular to a curved or bent glass sheet to be tempered. Such orientation provides better quenching gas distribution during cooling of a bent glass sheet and thereby provides a better product than would be the case with parallel tubes or passages. However, fabrication of this type of apparatus would be relatively expensive since the manifolds and tubes would have to be individually designed and fabricated for each particular bent shape to be tempered.

It is important with these types of apparatus to maintain uniform air flow and pressures. Conversely, it is highly undesirable to subject the heated glass sheet to any significant variation in pressure over its surface, especially for thin glass.

It is also desirable that the passages through which the cooling gas flows be constructed so as to reduce the amount of energy required to provide the cooling air while at the same time minimize back pressure effects particularly for thin glass.

DISCLOSURE OF THE INVENTION

An object of the present invention is to provide an improved composite blasthead for a quench station of a glass sheet tempering system.

A further object is to provide an improved composite blasthead for a quench station of a glass sheet tempering system wherein the blasthead cools the glass sheet material over its entire surface.

A further object is to provide an improved composite blasthead for a quench station of a glass sheet tempering system wherein the blasthead can be fabricated from inner and outer layers of sheet metal, the inner layer being machined so that a high pressure cooling fluid can be directed onto the glass sheet at substantially uniform pressures over the entire surface of the glass sheet.

Another object of the present invention is to provide an improved composite blasthead for a quench station of a glass sheet bending and tempering system.

In carrying out the above objects, a quench station for tempering glass sheets in accordance with the present invention includes opposed blastheads of a composite construction for supplying quenching gas to a heated glass sheet of a predetermined shape positioned therebetween such that the glass sheet is rapidly cooled to provide tempering thereof. Each blasthead includes a pair of outer metal layers and also includes an inner machinable metal layer attached to each of the outer layers. The inner layer defines a plurality of passages which extend generally perpendicular to the shape of the glass sheet and which have a generally circular cross section through which the quenching gas is supplied. The inner layer has inner end portions that cooperate to define inlets to the adjacent passages. The inner layer also has outer end portions that cooperate to define outlets through which the quenching gas exits.

Preferably, the inner layer of each blasthead is aligned with the inner layer of the other blasthead. The inner layers are sized and spaces such that the passages of the blastheads are aligned with each other such that the quenching gas impinges on the glass sheet at uniformly spaced locations.

Preferably, each of the passages is circular in cross section along substantially the entire length of the passage.

In one embodiment of the invention, the inner layer comprises a plurality of inserts and at least some of the inserts of one of the blastheads have diverging sides extending from the inner ends thereof to the outer ends thereof and at least some of the inserts of the other blasthead have converging sides extending from the inner ends thereof to their outer ends. The converging and diverging sided inserts are positioned such that the passages extend generally perpendicular to the predetermined bent shape of a bent glass sheet during the tempering in order to supply the quenching gas in a direction perpendicular to the glass sheet.

Each diverging sided insert on the one blasthead is aligned with a converging sided insert on the other blasthead. The diverging and converging sided inserts define the same included angle as each other and are sized and spaced such that the passages of each blasthead are aligned with the passages of the other blasthead, which together define an impingement pattern on the glass.

In the one embodiment, each blasthead also includes inserts having parallel sides extending between the inner and outer ends thereof such that the passages extend generally perpendicular to the bent shape of the glass sheet adjacent any generally straight portion along its shape. Vehicle rear windows conventionally include a generally straight portion with opposite bent ends. Such a bent glass sheet shape can be conveniently tempered by opposed blastheads including the converging, diverging, and parallel sided inserts in accordance with the invention.

In the one embodiment, each insert preferably includes an edge groove of a generally semicircular cross section extending between the inner and outer ends thereof on each side of the insert. Both the diverging and parallel sided inserts each have a curved inner end defining a pointed shape, while the converging sided insert has a curved inner end defining a rounded shape.

Great flexibility is achieved in being able to accommodate different conventional bent shapes to be tempered if the included angle defined by both the converging and diverging sided inserts is about 3°. Furthermore, all of the inserts are sized and spaced such that the passages of each blasthead are aligned with the passages of the other blasthead and such that the quenching gas impinges with the bent glass sheet at uniformly spaced locations.

In another embodiment of the invention, the inner layer comprises a single insert member which has been machined to provide the necessary cooling passages.

In still another embodiment of the invention, the inner layer comprises a pair of complimentary insert members which have been machined so when placed together provide the necessary cooling passages.

In the preferred construction, the pair of outer layers of each blasthead comprise steel sheets and the inner layers of each blasthead comprise at least one aluminum plate or steel bar. This construction provides the requisite strength by virtue of the outer sheet layers as well as ease in machinability by virtue of the aluminum plate or steel bar.

The objects, features and advantages of the present invention are readily apparent from the following detailed description of the best mode for carrying out the invention when taken in connection with the accompanying drawings.

BRIEF DESCRIPTION OF THE DRAWINGS

FIG. 11 is a sectional view similar to the sectional view of FIG. 2 and illustrates a fourth embodiment of blastheads constructed in accordance with the present invention and illustrates the composite construction;

FIG. 12 is a sectional view taken through the blastheads along line 12—12 in FIG. 11 and illustrates the manner in which the inner layers of inserts are positioned between the outer layers of the blastheads to provide its composite construction;

FIG. 13 is an enlarged view of the portion of the lower blasthead of FIG. 12;

FIG. 14 is a view similar to FIG. 13 showing an alternative location of the inner layer; and FIG. 15 is a view similar to FIG. 13 illustrating substantially no convergence of the interior passage.

BEST MODE FOR CARRYING OUT THE INVENTION

Figure 1:
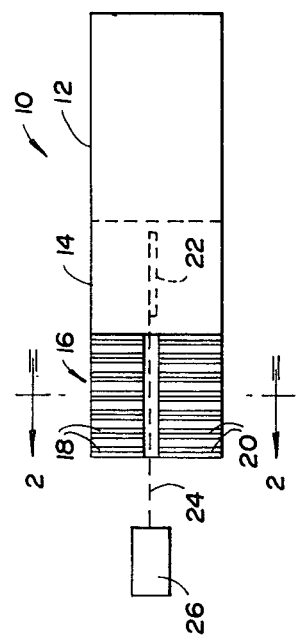
FIG. 1 is a schematic side elevation view of a glass sheet bending and tempering system including a quench station having composite blastheads constructed in accordance with the present invention.

Referring to FIG. 1 of the drawings, a glass sheet bending and tempering system generally indicated by reference numeral 10 includes a furnace 12 in which glass sheets are heated to a sufficiently high temperature for bending and subsequent tempering. Adjacent one of its ends, furnace 12 includes a bending station 14 at which the heated glass sheets are bent. Adjacent the bending station 14, the system 10 includes a quench station 16 for tempering bent glass sheets. Quench station 16 includes sets of opposed upper and lower blastheads 18 and 20 that have a composite construction in accordance with this invention. Quenching gas is fed through the blastheads 18 and 20 and will conventionally be air supplied thereto by suitable blowers.

While the present invention is described herein with reference to a bent glass sheet, it is to be understood that the present invention can be utilized with flat glass sheets.

A bent glass sheet is moved on a schematically indicated mold 22 by a shuttle 24 under the operation of a suitable actuator 26 in order to position a bent glass sheet between the opposed blastheads 18 and 20 for tempering. The mold 22 is of the open center ring type whose periphery corresponds to the periphery of a bent glass sheet to be tempered such that quenching gas can be supplied to the bent glass sheet over substantially its entire area of both surfaces.

Figure 2:
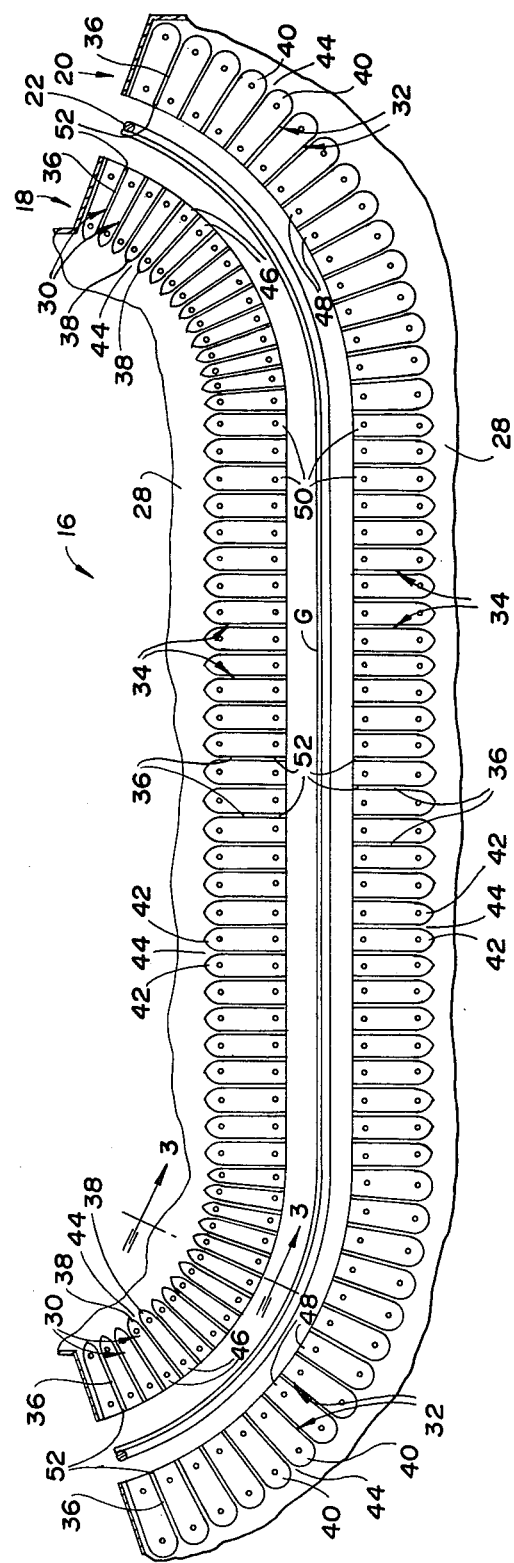
FIG. 2 is a sectional view taken through the quench station along line 2—2 of FIG. 1 and illustrates opposed blastheads thereof with the composite construction of this invention.
Figure 3:
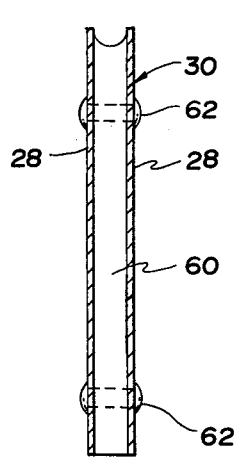
FIG. 3 is a sectional view through one of the blastheads taken along line 3—3 in FIG. 2 and illustrates the manner in which an inner layer of inserts are positioned between outer layers of the blasthead to provide its composite construction.

As illustrated in FIGS. 2 and 3, each of the opposed blastheads 18 and 20 includes a pair of outer layers 28 and also includes an inner layer comprising a plurality of inserts 30, 32 and 34 positioned between the outer layers 28. These inserts 30, 32, and 34 cooperate with each other as shown in FIG. 2 to define passages 36 through which the quenching gas is supplied. Each insert 30, 32, and 34 has a curved inner end portion 38, 40 and 42, respectively, that cooperates with the inserts on each side thereof to define converging inlets 44 to the adjacent passages 36. Each insert 30, 32 and 34 also includes outer end portion 46, 48, and 50, respectively, that cooperate with the inserts on each side thereof to define outlets 52 through which the quenching gas exits the blasthead passages 36. At least some of the inserts 30 of the one blasthead 18 have diverging sides 54 (FIG. 5) extending from their inner end portion 38 to their outer end portion 46. At least some of the inserts 32 of the outer blasthead 20 have converging sides 56 (FIG. 6) extending from their inner end portions 40 to their outer end portions 48. The inserts 30 and 32 are positioned such that the passages 36 defined thereby extend generally perpendicular to the predetermined bent shape of the glass sheet adjacent these inserts. Quenching gas is thus supplied to the glass sheet G in a perpendicular relationship adjacent its bent areas in order to provide effective tempering.

As seen in FIG. 2, each diverging sided insert 30 on the one blasthead 18 is aligned with a converging sided insert 32 on the other blasthead 20. These diverging and converging sided inserts 30 and 32 define the same included angle as each other and are sized and spaced with respect to each other such that the passages 36 defined thereby are aligned with each other. As such, each flow of quenching gas is opposed by another aligned flow so as to optimize glass quenching.

As seen in FIG. 2, each of the blastheads 18 and 20 also includes a plurality of the inserts 34 which have parallel sides 58 (FIG. 4) extending between their inner and outer end portions 42 and 50. The inserts 34 are positioned adjacent the generally straight portion of the glass sheet between its opposite bent ends such that the passages 36 defined thereby extend generally perpendicular to the adjacent straight portion of the glass sheet. Each insert 34 on the one blasthead 18 is aligned with another insert 34 on the other blasthead 20 such that the passages 36 defined thereby are aligned with each other. As such, the flows of quenching gas from these passages oppose each other to maximize the degree of tempering.

With reference to FIGS. 4 through 7, each of the inserts 30, 32, and 34 preferably includes an edge groove 60 of a generally semicircular cross section extending between the associated inner and outer ends thereof on each side of the insert. Inserts 30 and 34 which are respectively shown in FIGS. 5 and 4, and which respectively have diverging and parallel sides, have curved inner end portions 38 and 42 of a pointed shape; while the inserts 32 having the converging sides have a curved inner end portion 40 of a rounded shape.

Figure 5:
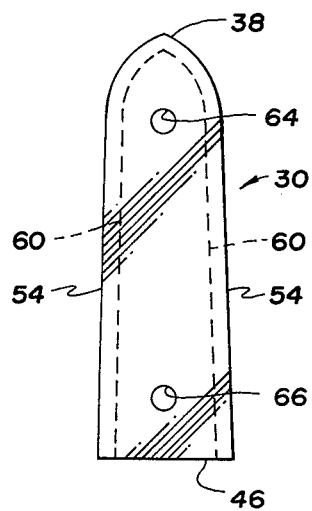
FIG. 5 is an enlarged view of one of the blasthead inserts which has sides that diverge from an upper inner end thereof toward a lower outer end thereof adjacent which the quenching gas exits the blasthead.
Figure 6:
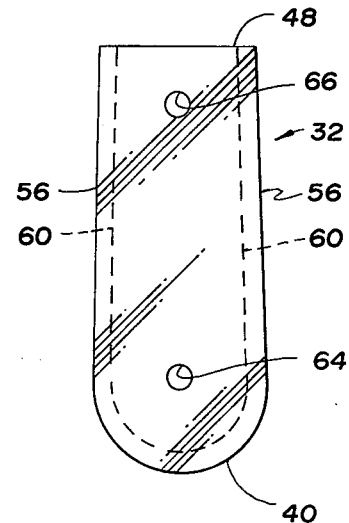
FIG. 6 is an enlarged view of one of the inserts which has converging sides extending from a lower inner end thereof toward an upper outer end thereof adjacent which the quenching gas exits the blasthead.
Figure 7:
FIG. 7 is a sectional view taken along line 7—7 in FIG. 4 to illustrate the manner in which each insert is provided with an edge groove of a generally semicircular cross section extending between its inner and outer ends at each side of the insert.

Both the diverging sided insert 30 shown in FIG. 5 and the converging sided insert 32 shown in FIG. 6 preferably define an included angle of about 3° so as to provide flexibility in accommodating different shaped bent glass sheets to be tempered. Also, all of the inserts 30, 32, and 34 are sized and spaced such that the passages 36 are not only aligned with each other but also impinge with the glass sheet at uniformly spaced locations over both its bent and generally straight areas. To provide this result, it will be noted that the inner end portion 46 of the insert 30 is smaller than the inner end portion 48 of the insert 32 such that the two passages 36 defined by each of these inserts are aligned with the two passages 36 defined by the other insert, and the inner end portion 50 of the insert 34 has a size that is equal to the average size of the smaller insert end portion 46 and the larger insert end portion 48. With inserts of this size, projections of the passages 36 intersect the bent glass sheet at uniform intervals so as to provide the uniform distribution of quenching gas. Best results are achieved when the spaced locations of the quenching gas impingement with the glass sheet are on centers spaced about 1¼ inches (i.e. about 3.2 cm) from each other.

It should also be noted that the converging inlets 44 defined by the curved inner end portions 38, 40 and 42 of the inserts 30, 32, and 34 provide efficient gas flow through the passages 36 and thereby reduce the power input to the quench unit in order to promote energy efficiency.

Figure 4:
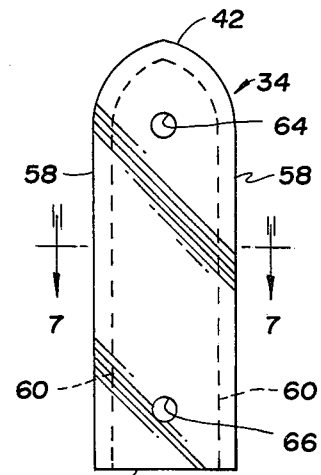
FIG. 4 is an enlarged view of one blasthead insert having parallel sides extending from an upper inner end thereof to a lower outer end thereof adjacent which the quenching gas exits the blasthead.

With reference to FIG. 3, the pair of outer layers 28 of each blasthead preferably comprise steel sheets to provide adequate strength at the elevated temperature involved when the blastheads are exposed to the heated glass sheets. Furthermore, the inserts 30, 32, and 34 as best seen in FIGS. 4 through 6 preferably comprise aluminum plates which can be conveniently machined for aluminum plates. Aluminum inserts 30, 32, and 34 can also be cast and then machined if necessary.

As seen in FIG. 3, each blasthead also includes fasteners preferably embodied by pairs of rivets 62 that secure the aluminum inserts to the outer sheet steel layers 28. As seen in FIGS. 4 through 6, each of the inserts 30, 32, and 34 includes a pair of holes 64 and 66 respectively adjacent their inner and outer ends. The rivets 62 extend through the holes 64 and 66 and through aligned holes in the outer sheet steel layers 28 to secure the inner and outer ends of each aluminum insert between the outer layers.

Figure 8:
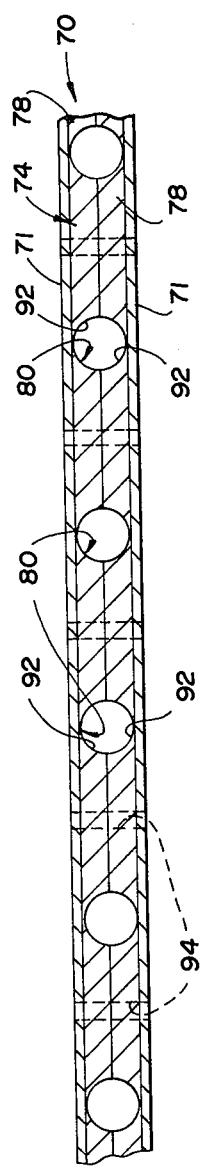
FIG. 8 is a sectional view through a second embodiment of a blasthead constructed in accordance with the present invention and illustrates the composite construction.

Referring to FIG. 8 of the drawings, there is shown a portion of a second embodiment of a blasthead 70 that has a composite construction in accordance with this invention. As in the first embodiment, quenching gas is fed through the blasthead 70. The blasthead 70 includes a pair of outer layers 71 and also includes an inner layer or insert 74 positioned between the outer layers 71. The insert 74 comprises a pair of insert members 78 which cooperate with each other as shown in FIG. 8 to define passages 80 through which the quenching gas is supplied.

Figure 9:
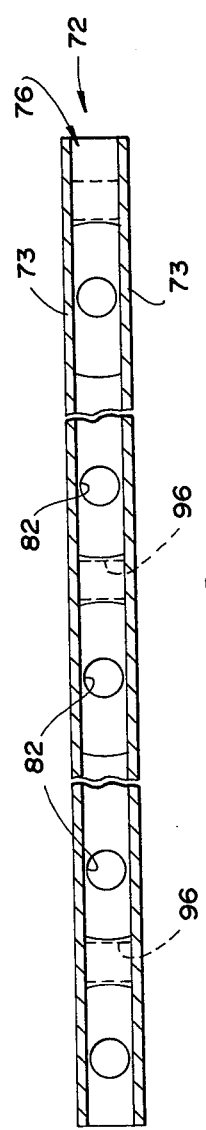
FIG. 9 is a sectional view through a third embodiment of a blasthead constructed in accordance with the present invention and also illustrates the composite construction.
Figure 10:
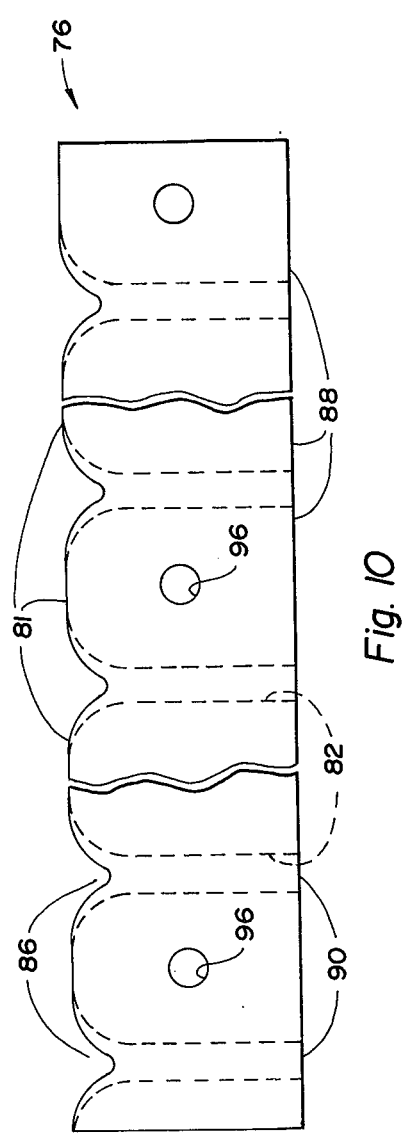
FIG. 10 is a side elevational view of the inner layer of the third embodiment.

Referring now to FIGS. 9 and 10, there is shown a portion of a third embodiment of a blasthead 72 that again has a composite construction in accordance with this invention. Again, quenching gas is fed through the blasthead 72.

As illustrated in FIG. 9, the blasthead 72 includes a pair of outer layers 73, a single insert 76, positioned between the outer layers 73. The insert 76 is machined as indicated in FIGS. 9 and 10 so that passages 82 are formed through which the quenching gas is supplied.

In each of the second and third embodiments each insert 74 and 76 has curved inner end portions 81 which cooperate to define converging inlets 86 to the adjacent passages 80 and 82 (the curved inner end portions for the second embodiment is not shown for the sake of simplicity).

Each insert 74 and 76 also includes outer end portions 88 which cooperate to define outlets 90 through which the quenching gas exits the blasthead passages 80 and 82. Each of the passages 80 and each of the passages 82 are machined so as to be parallel with each other to thereby extend generally perpendicular to the adjacent straight edge portion of a glass sheet.

Each insert 74 and 76 on the one blasthead 70 and 72 is aligned with another insert on its complimentary blasthead (not shown) such that the passages 80 and 82 are aligned with each other so that the flow of the quenching gas from these passages 80 and 82 oppose each other to maximize the degree of glass tempering.

With reference to FIG. 8, each of the insert members 78 include a groove 92 of a generally semicircular cross section extending between the associated inner and outer edge portions thereof.

The converging inlets 86 defined by the curved end portions 81 of the inserts 76 and 78 and their circular cross section provide efficient gas flow through the passages 80 and 82 to thereby reduce the power input to the quench unit in order to promote energy efficiency.

As in the case of the first embodiment, in the second and third embodiments, the pair of outer layers 71 and 73 of each blasthead preferably comprise steel sheets to provide adequate strength at the elevated temperature involved when the blastheads are exposed to the heated glass sheets. Furthermore, the inserts or inner layers 74 and 76 preferably comprise aluminum sheets which can be conveniently machined. The aluminum inserts 74 and 76 can also be cast and then machined if necessary.

Each blasthead 70 and 72 can also include fasteners embodied by rivets (not shown) to secure the aluminum inserts 74 and 76 to the outer sheet steel layers 71 and 73. However, it is to be understood that the inserts 74 and 76 could be secured to the outer layers 71 and 73 by other means such as by welding or by an adhesive.

As seen in FIGS. 8 through 10, each of the inserts 74 and 76 includes holes 94 and 96, respectively. The rivets extend through the holes 94 and 96 and through aligned holes in the outer sheet steel layers 71 and 73 to secure the aluminum inserts 74 and 76 between the outer layers 71 and 73.

Referring to FIGS. 11 through 14, the quench station includes sets of opposed upper and lower blastheads 118 and 120 of a fourth embodiment of the present invention which has a composite construction in accordance with this invention. The quenching gas, which is preferably air, is fed through the blastheads 118 and 120 by several blowers.

As illustrated in FIGS. 11 through 13, each of the opposed blastheads 118 and 120 includes a pair of outer layers 128 and also includes an inner layer comprising an insert or bar 130 positioned between the outer layers 128. These bars 130 cooperate with each other as shown in FIG. 12 to define passages 136 through which the quenching gas is supplied. Each insert 130 has a plurality of inner end portions 138 that cooperate with each other to define inlets 144 to the adjacent passages 136. Each insert 130 also includes a plurality of outer end portions 146 that cooperate with each other to define outlets 152 in which the quenching gas exits the blasthead passage 136 (center line of the passages 136 being indicated by dashed lines at 154 in FIG. 11).

The passages 136 are drilled or punched through the bars 130 such that the passages 136 extend generally perpendicular to the predetermined bent glass of the glass sheet adjacent the passages 136. Quenching gas is thus supplied to the glass sheet G in a perpendicular relationship adjacent its bent areas in order to provide effective tempering. Furthermore, the quenching gas impinges on the glass surfaces in a uniform pattern.

Convergence of the converging inlets 144 defined by the curved inner end portions 138 is exaggerated in FIGS. 12 and 13 for purposes of illustration if the passages 136 are formed by stamping. Very little convergence, if any, is obtained when the passages 136 are formed by drilling as shown in FIG. 15.

The circular cross section of the passages 136 which extend along the entire length of the passages 136 reduces the power input to the quench unit in order to promote energy efficiency as in the other embodiments. The bars 130 preferably comprise steel which can be conveniently machined from a steel bar.

Each bar is preferably welded to the outer steel sheets 128 along spaced intervals. However, it is also to be understood that the steel bar 130 can also be secured to the outer layers 128 by an adhesive or other means.

FIG. 14 illustrates a different attachment location for the inner layer to the outer layers wherein like components to the components of FIG. 13 are primed. The attachment location of FIG. 14 is especially desirable when the width of the inner layer is relatively small. Otherwise, the components of FIGS. 13 and 14 are substantially the same and operate in substantially the same way to get substantially the same improved quenching or tempering result.

While the best mode for carrying out the invention has been described in detail, those familiar with the art to which this invention relates will recognize various alternative designs and embodiments for practicing the present invention as defined by the following claims.

What is claimed is:

1. A quench station for tempering glass sheets comprising: opposed blastheads of a composite construction for supplying quenching gas to a heated glass sheet of a predetermined shape positioned therebetween such that the glass sheet is rapidly cooled to provide tempering thereof; each blasthead including a pair of outer metal layers and also including an inner machinable metal layer attached to each of said outer layers; said inner layer defining a plurality of passages which extend generally perpendicular to the shape of the glass sheet, each of said passages having a generally circular cross section along substantially the entire length of each of the passages and through which the quenching gas is supplied; each of said passages having inlet and outlet ends, said inlet end having a diameter at least slightly larger than said outlet end; said inner layer having inner end portions that cooperate to define inlets to the adjacent passages; said inner layer also having outer end portions that cooperate to define outlets through which the quenching gas exits and wherein the inner layer of each blasthead is aligned with the inner layer of the other blasthead, and the inner layers being sized and spaced such that the passages of the blastheads are aligned with each other such that the quenching gas impinges on the glass sheet at uniformly spaced locations.

2. A quench station as in claim 1 wherein said inner layer comprises a pair of insert members, said insert members cooperating to define opposing side portions extending between the inner and outer ends thereof such that the passages extend generally perpendicular to the shape of the glass sheet adjacent any generally straight portion of the glass sheet.

3. A quench station as in claim 2 wherein each side portion includes an edge groove of a generally semicircular cross section extending between the inner and outer ends thereof.

4. A quench station for tempering glass sheets comprising: opposed blastheads of a composite contruction for supplying quenching gas to a heated glass sheet of a predetermined shape positioned therebetween such that the glass sheet is rapidly cooled to provide a tempering thereof; each blasthead including a pair of outer layers comprising metal sheets; each blasthead also including an inner, machinable metal layer attached to each of said outer sheet layers; means for securing the inner layers to the outer sheet layers; each inner layer being machined to define passages having a generally circular cross section along substantially the entire length of each of the passages and through which the quenching gas is supplied; each of said passages having inlet and outlet ends, said inlet end having a diameter at least slightly larger than said outlet end; each inner layer having inner end portions that define inlets to the adjacent passages; each inner layer also having outer end portions that define outlets through which the quenching gas exits; such that the passages extend generally perpendicular to the predetermined shape of the glass sheet during the tempering.

5. A quench station for tempering bent glass sheets comprising: opposed blastheads of a laminated construction for supplying quenching gas to a heated glass sheet of a predetermined bent shape positioned therebetween such that the glass sheet is rapidly cooled to provide tempering thereof; each blasthead including a pair of outer layers comprising metal sheets; each blasthead also including a plurality of inserts comprising plates positioned between said outer sheet layers; said inserts cooperating with each other to define passages having a generally circular cross section along substantially the entire length of each of the passages and through which said quenching gas is supplied; each of said passages having inlet and outlet ends, said inlet end having a diameter at least slightly larger than said outlet end; each insert having a curved inner end that cooperates with the inserts on each side thereof to define converging inlets to the adjacent passages; each insert also having an outer end that cooperates with the inserts on each side thereof to define outlets through which the quenching gas exits; and at least some of the inserts of one blasthead having diverging sides extending from the inner ends thereof to the outer ends thereof, at least some of the inserts of the other blasthead having converging sides extending from the inner ends thereof to the outer ends thereof, and at least some of the inserts of both blastheads having parallel sides extending between the inner and outer ends thereof whereby the passages extend generally perpendicular to the predetermined bent shape and any generally straight portion of the glass sheet during the tempering.

6. A quench station for tempering bent glass sheets comprising: upper and lower opposed blastheads of a composite construction for supplying quenching gas to a heated glass sheet of a predetermined bent shape positioned therebetween such that the glass sheet is rapidly cooled to provide tempering thereof; each blasthead including a pair of outer layers comprising metal sheets; each blasthead also including an inner layer comprising a plurality of inserts comprising metal plates positioned between said outer sheet layers; means for securing the plates between the outer sheet layers; said plates cooperating with each other to define passages having a generally circular cross section along substantially the entire length of each of the passages and through which the quenching gas is supplied; each of said passages having inlet and outlet ends, said inlet end having a diameter at least slightly larger than said outlet end; each insert having a curved inner end that cooperates with the inserts on each side thereof to define converging inlets to the adjacent passages; each insert also having an outer end that cooperates with the inserts on each side thereof to define outlets through which the quenching gas exits; at least some of the inserts of one blasthead having diverging sides extending from the inner ends thereof to the outer ends thereof; at least some of the inserts of the other blasthead having converging sides extending from the inner ends thereof to the outer ends thereof; at least some of the inserts of both blastheads having parallel sides extending between the inner and outer ends thereof; the diverging and converging sided inserts defining the same included angle as each other; and all of the inserts being sized and spaced such that the passages of each blasthead are aligned with the passages of the other blasthead and such that the quenching gas impinges with the bent glass sheet in a perpendicular relationship thereto at uniformly spaced locations.

7. A quench station for tempering bent glass sheets comprising: upper and lower opposed blastheads of a composite construction for supplying quenching gas to a heated glass sheet of a predetermined bent shape positioned therebetween such that the glass sheet is rapidly cooled to provide tempering thereof; each blasthead including a pair of outer layers comprising sheets; each blasthead also including an inner layer comprising a plurality of metal inserts positioned between said outer layers; said inserts cooperating with each other to define passages having a generally circular cross section along substantially the entire length of each of the passages and through which the quenching gas is supplied; each of said passages having inlet and outlet ends, said inlet end having a diameter at least slightly larger than said outlet end; each insert having a curved inner end that cooperates with the inserts on each side thereof to define converging inlets to the adjacent passages; each insert also having an outer end that cooperates with the inserts on each side thereof to define outlets through which the quenching gas exits; pairs of rivets that respectively secure the inner and outer ends of each insert between the outer sheet steel layers; at least some of the inserts of one blasthead having diverging sides extending from the inner ends thereof to the outer ends thereof; at least some of the inserts of the other blasthead having converging sides extending from the inner ends thereof to the outer ends thereof; at least some of the inserts of both blastheads having parallel sides extending between the inner and outer ends thereof; the diverging and converging sided inserts defining the same included angle as each other; all of the inserts being sized and spaced such that the passages of each blasthead are aligned with the passages of the other blasthead and such that the quenching gas impinges with the bent glass sheet in a perpendicular relationship thereto at uniformly spaced locations; each insert including an edge groove of a generally semicircular cross section extending between the inner and outer ends thereof on each side thereof; and the curved inner end of each diverging and parallel sided insert having a pointed shape and the curved inner end of each converging sided insert having a rounded shape.

* * * * *